(12) United States Patent
Jing et al.

(10) Patent No.: US 11,152,789 B2
(45) Date of Patent: Oct. 19, 2021

(54) METHOD, DEVICE, AND SYSTEM FOR CONTROLLING OPERATION OF GENERATOR

(71) Applicant: BEIJING GOLDWIND SCIENCE & CREATION WINDPOWER EQUIPMENT CO., LTD., Beijing (CN)

(72) Inventors: Chunyang Jing, Beijing (CN); Xianyou Wu, Beijing (CN); Zhaochong Sun, Beijing (CN)

(73) Assignee: BEIJING GOLDWIND SCIENCE & CREATION WINDPOWER EQUIPMENT CO., LTD., Beijing (CN)

( * ) Notice: Subject to any disclaimer, the term of this patent is extended or adjusted under 35 U.S.C. 154(b) by 0 days.

(21) Appl. No.: 16/958,014

(22) PCT Filed: May 16, 2018

(86) PCT No.: PCT/CN2018/087071
§ 371 (c)(1),
(2) Date: Jun. 25, 2020

(87) PCT Pub. No.: WO2019/128042
PCT Pub. Date: Jul. 4, 2019

(65) Prior Publication Data
US 2021/0066920 A1    Mar. 4, 2021

(30) Foreign Application Priority Data
Dec. 28, 2017  (CN) .......................... 201711461307.1

(51) Int. Cl.
*H02J 3/38* (2006.01)
*H02J 3/40* (2006.01)
(Continued)

(52) U.S. Cl.
CPC ................ *H02J 3/381* (2013.01); *H02J 3/38* (2013.01); *H02J 3/40* (2013.01); *H02J 3/46* (2013.01); *H02P 9/00* (2013.01)

(58) Field of Classification Search
CPC ...... H02J 3/381; H02J 3/38; H02J 3/40; H02J 3/46; H02P 9/00
(Continued)

(56) References Cited

U.S. PATENT DOCUMENTS

| | | | |
|---|---|---|---|
| 6,519,170 B2 * | 2/2003 | Lacaze | H02M 5/271 363/152 |
| 7,075,206 B1 * | 7/2006 | Chen | H02K 3/28 310/179 |

(Continued)

FOREIGN PATENT DOCUMENTS

| | | |
|---|---|---|
| CN | 102624297 A | 8/2012 |
| CN | 202455094 U | 9/2012 |

(Continued)

OTHER PUBLICATIONS

International Search Report dated Sep. 28, 2018; PCT/CN2018/087071.

(Continued)

*Primary Examiner* — Pedro J Cuevas (57) ABSTRACT

Provided are a method, a device, and system for controlling an operation of a generator, where the generator includes at least two power generation and transmission loops. The method includes: upon detecting the failure of any one of the at least two power generation and transmission loops, determining whether a preset condition for entering a partial power operation mode is satisfied; and when it is determined that the preset condition is satisfied, controlling at least one non-malfunctioning power generation and transmission loop of the at least two power generation and transmission loops to enter an operation mode, and controlling the malfunc- (Continued)

tioning power generation and transmission loop to enter a shutdown state, so that the generator enters the partial power operation mode.

13 Claims, 6 Drawing Sheets

(51) Int. Cl.
*H02J 3/46* (2006.01)
*H02P 9/00* (2006.01)

(58) Field of Classification Search
USPC .............................................................. 290/7
See application file for complete search history.

(56) References Cited

U.S. PATENT DOCUMENTS

| | | | | |
|---|---|---|---|---|
| 7,256,508 | B2* | 8/2007 | Altemark | H02J 13/00036 |
| | | | | 290/44 |
| 7,928,623 | B2* | 4/2011 | Lacaze | H02M 5/271 |
| | | | | 310/179 |
| 8,519,591 | B2* | 8/2013 | Nishimura | H02K 3/28 |
| | | | | 310/198 |
| 9,106,168 | B2* | 8/2015 | Lacaze | H02P 25/22 |
| 9,667,189 | B2 | 5/2017 | Li et al. | |
| 10,294,868 | B2* | 5/2019 | Poumarede | F02C 7/275 |
| 10,389,284 | B2* | 8/2019 | Freire | H02P 9/105 |
| 10,637,248 | B2* | 4/2020 | Letas | F03D 80/85 |
| 10,804,829 | B2* | 10/2020 | Freire | H02P 21/141 |
| 2002/0093840 | A1* | 7/2002 | Lacaze | H02M 5/271 |
| | | | | 363/152 |
| 2006/0214428 | A1* | 9/2006 | Altemark | H02J 9/06 |
| | | | | 290/44 |
| 2008/0079400 | A1* | 4/2008 | Lacaze | H02P 27/16 |
| | | | | 322/20 |
| 2011/0131796 | A1* | 6/2011 | Lacaze | H02P 25/22 |
| | | | | 29/596 |
| 2013/0297085 | A1 | 11/2013 | Xiongzhe et al. | |
| 2014/0292088 | A1* | 10/2014 | Eichert | F03B 13/00 |
| | | | | 307/82 |
| 2015/0333678 | A1 | 11/2015 | Son | |
| 2016/0211763 | A1 | 7/2016 | Wang et al. | |
| 2017/0184032 | A1* | 6/2017 | Poumarede | F02C 7/275 |
| 2017/0279391 | A1* | 9/2017 | Freire | H02P 9/105 |
| 2017/0331295 | A1* | 11/2017 | Abeyasekera | F03D 9/255 |
| 2018/0123470 | A1* | 5/2018 | Nielsen | H02P 29/02 |
| 2018/0287369 | A1* | 10/2018 | Letas | H02J 3/381 |
| 2018/0287386 | A1* | 10/2018 | Oates | H02J 3/00125 |
| 2018/0323619 | A1* | 11/2018 | Ganireddy | H02J 3/46 |
| 2019/0006912 | A1 | 1/2019 | Zhu et al. | |
| 2019/0137568 | A1* | 5/2019 | Freire | F03D 9/25 |
| 2019/0238077 | A1* | 8/2019 | Azar | F03D 9/257 |
| 2020/0036311 | A1* | 1/2020 | Freire | F03D 9/22 |

FOREIGN PATENT DOCUMENTS

| | | |
|---|---|---|
| CN | 104533725 A | 4/2015 |
| CN | 104579067 A | 4/2015 |
| CN | 105186567 A | 12/2015 |
| CN | 105680567 A | 6/2016 |
| CN | 205377311 U | 7/2016 |
| CN | 106286129 A | 1/2017 |
| CN | 107404207 A | 11/2017 |
| EP | 3010110 A1 | 4/2016 |

OTHER PUBLICATIONS

The First Chinese Office Action dated Mar. 26, 2020; Appln. No. 201711461307.1.

The Extended European Search Report dated Dec. 4, 2020; Appln. No. 18893540.7.

Australian Examination Report No. 2, dated Jun. 18, 2021; Appln. No. 2018398707.

\* cited by examiner

METHOD, DEVICE, AND SYSTEM FOR CONTROLLING OPERATION OF GENERATOR

This application is the national phase of International Application No. PCT/CN2018/087071, titled "METHOD, DEVICE AND SYSTEM FOR CONTROLLING OPERATION OF GENERATOR", filed on May 16, 2018, which claims the priority to Chinese Patent Application No. 201711461307.1, titled "METHOD, DEVICE, AND SYSTEM FOR CONTROLLING OPERATION OF GENERATOR", filed on Dec. 28, 2017 with the China National Intellectual Property Administration (CNIPA), which is incorporated herein by reference in its entireties.

TECHNICAL FIELD

The present application relates to the technical field of electric generator, and in particular to a method, a device and a system for controlling an operation of a generator set.

BACKGROUND

A generator set refers to a power generation device that can convert mechanical energy or other energy into electric energy. Taking a wind turbine as an example, the wind turbine converts wind energy which is green energy in nature into electric energy, and electric energy generated by the wind turbine is transmitted to each load center through a power system. Normally, when the generator set is operating normally, a converter or devices in a main circuit are also in a normal operation state. When the generator set fails, it probably results in lack of capability for the overall generator set to generate electricity normally, and the generator set can recover to normal operation only after the failed device has been repaired, which means that the generator set can normally generate electricity only after fixing the fault during stop operation of the generator set. If the generator set is not repaired in time, the amount of generated electricity will be lost, especially for a generator set applied at sea. Once the generator set at sea fails, cost for repair and maintenance is high, and time spent on repair greatly depends on objective factors.

SUMMARY

A method for controlling an operation of a generator set is provided in the present disclosure. The generator set includes at least two circuits for power generation and transmission, where the method includes:

determining whether a preset condition for switching into a partial power operation mode is satisfied, in response to detecting that any one of the at least two circuits for power generation and transmission fails; and in response to determining that the preset condition for switching into the partial power operation mode is satisfied, controlling at least one circuit for power generation and transmission without a fault among the at least two circuits for power generation and transmission to enter an operation mode, and controlling a circuit for power generation and transmission with a fault to enter a shutdown state, so that the generator set enters the partial power operation mode.

An apparatus for controlling an operation of a generator set is further provided in the present disclosure, where the generator set includes at least two circuits for power generation and transmission. The apparatus includes: a detection and determination module, configured to determine whether a preset condition for switching into a partial power operation mode is satisfied, in response to detecting that any one of the at least two circuits for power generation and transmission fails; and an operation mode control module, configured to control at least one circuit for power generation and transmission without a fault among the at least two circuits for power generation and transmission to enter an operation mode, and control a circuit for power generation and transmission with a fault to enter a shutdown state, in a case that the detection and determination module detects that the preset condition for switching into the partial power operation mode is satisfied, so that the generator set enters the partial power operation mode.

A system for controlling an operation of a generator set is further provided in the present disclosure, where the generator set includes at least two circuits for power generation and transmission. The system includes: a memory; a processor connected to the memory and connected to the at least two circuits for power generation and transmission; and at least one program stored in the memory, when executed by the processor, to perform the method for controlling the operation described above.

A storage medium is further provided in the present disclosure. The storage medium stores a computer program corresponding to the method for controlling the operation described above.

The present disclosure proposes a method for controlling fault-tolerant operation of a generator set including at least two main circuits. Under the partial power operation mode in the present disclosure, failure of one set of converter may not influence the operation of another set of converter. The technical solution of the present disclosure can significantly reduce power generation loss caused by the failure of the main circuit of the generator set and improve the reliability of the generator set.

DETAILED DESCRIPTION OF EMBODIMENTS

For a conventional generator, once a generator set fails, it is likely that the overall generator set cannot generate electricity normally, and only the failed device has been repaired, can the generator set recover to normal operation. In view of this problem, the inventor of the present disclosure has conceived a method for controlling a generator set to operate with partial power in a case that a main circuit of the generator set fails. To operate with partial power involved in the present disclosure refers to that, for a generator set including multiple circuits (or at least two circuits), only part of the circuits is operating, and the remaining circuits are not operating.

The inventor of the present disclosure found that, a multi-winding permanent magnet direct-driven motor usually includes multiple circuits for power generation and transmission, and each set of windings of the multi-winding permanent magnet direct-driven motor is equivalent to an independent motor, and the converter also uses a set of modules correspondingly, which forms a basis for a generator set to operate with partial power.

Embodiments of the present disclosure are described in detail hereinafter in conjunction with the drawings. Examples of the embodiments are illustrated in the drawings, in which the same or similar reference numerals indicate the same or similar elements, or elements with the same or similar functions. The embodiments described by drawings hereinafter are merely illustrative, and are simply used to explain the present disclosure, which should not be understood to limit the present disclosure.

Figure 1:
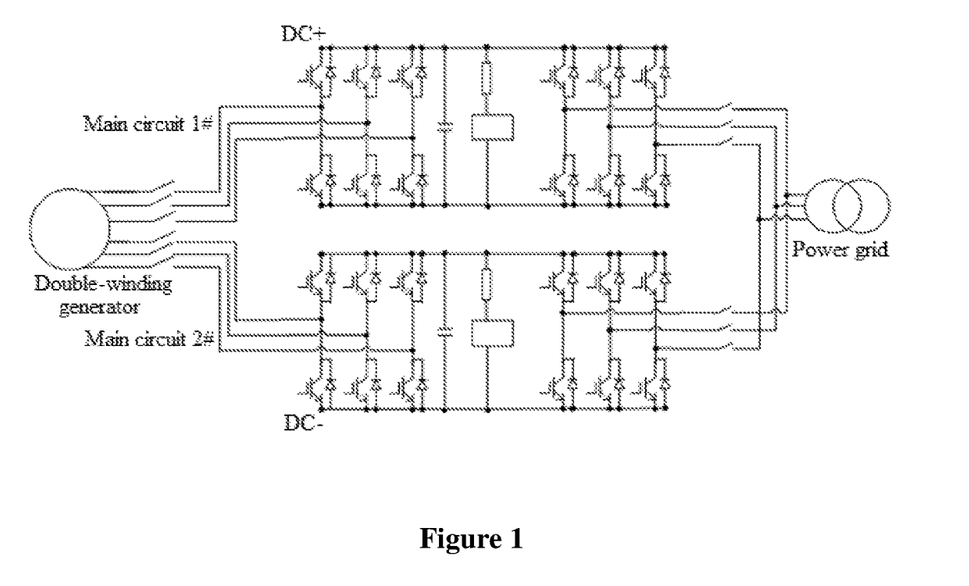
FIG. 1 is a topology diagram of two main circuits of a generator set according to an embodiment of the present disclosure.

Reference is made to FIG. 1, which is a topology diagram of an example of two main circuits of a generator set according to an embodiment of the present disclosure. FIG. 1 shows a topology of two main circuits of a double-winding generator. The generator set includes two set of windings belonging to two main circuits shown in FIG. 1, that is main circuit 1 # and main circuit 2 #, respectively, where a main circuit refers to a circuit for power generation and transmission in an embodiment of the present disclosure. Each of the main circuits may include a sub group of converters matched with a winding of a corresponding generator. A terminal of the main circuit 1 # is connected to a power grid, and another terminal of the main circuit 1 # is connected to one set of windings of the double-winding generator. A terminal of the main circuit 2 # is connected to the power grid, and another terminal of the main circuit 2 # is connected to another set of windings of the double-winding generator. The sub group of converters described in the embodiments of the present disclosure is also referred to a converter for short. The converter serves as a power conversion system of the generator set, and is used to convert electric energy of the generator having non-power frequency and with voltage variation into electric energy with stable power frequency. The present disclosure is not limited to the generator set including two main circuits as shown in FIG. 1, but is also applicable to a generator set including three or more main circuits.

Figure 2:
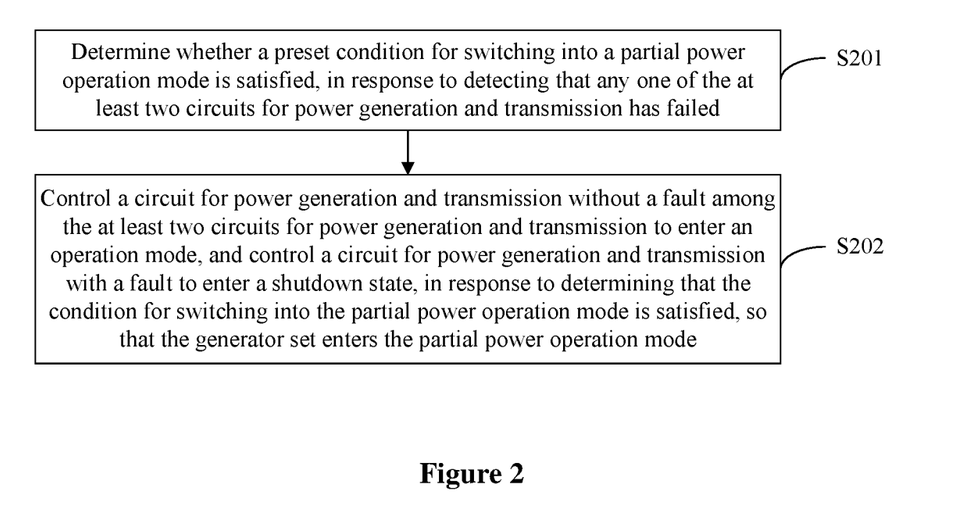
FIG. 2 is a schematic flow chart of a method for controlling an operation of a generator set according to an embodiment of the present disclosure.

A method for controlling an operation of a generator set is provided in an embodiment of the present disclosure, where the generator set includes at least two circuits for power generation and transmission. Referring to FIG. 2, the method for controlling an operation of a generator set includes following steps S201 and S202.

In step S201, it is determined that whether a preset condition for switching into a partial power operation mode is satisfied, in response to detecting that any one of the at least two circuits for power generation and transmission fails.

In step S202, it is to control at least one circuit for power generation and transmission without a fault among the at least two circuits for power generation and transmission to enter an operation mode, and control a circuit for power generation and transmission with a fault to enter a shutdown state, in response to determining that the preset condition for switching into the partial power operation mode is satisfied, so that the generator set enters the partial power operation mode.

FIG. 2 shows two main flow nodes of the embodiment of the present disclosure. One node refers to detecting a fault and determining whether the condition for switching into the partial power operation mode is satisfied, and the other node refers to control the circuit to enter the partial power operation mode. Specifically, for example, when a main control system detects that the main circuit 1 # or the main circuit 2 # has failed, it is determined that whether the circuit without a fault meets the preset condition for switching into the partial power operation mode; in a case of determining that the preset condition for switching into the partial power operation mode is satisfied, it is to control the circuit for power generation and transmission without a fault to enter an operation mode, and control the circuit for power generation and transmission with a fault to enter a shutdown state, so that the generator set enters the partial power operation mode.

The method for controlling an operation of a generator set according to the embodiment of the present disclosure can solve the following problem. For a generator set including at least two circuits for power generation and transmission, when any one of the two circuits for power generation and transmission fails, the generator set must be shut down for repair, resulting in a power generation loss. According to the embodiment of the present disclosure, the power generation loss caused by the failure of the main circuits of the generator set is significantly reduced. Taking a wind turbine as an example, when a set of converters, or a corresponding set of water cooling systems of the wind turbine fails, or a set of windings of the wind turbine is damaged, it is to control the main circuit of the wind turbine to operate with partial power in the present disclosure, and thus the power generation loss is reduced, and the reliability of the wind turbine is improved.

Figure 3:
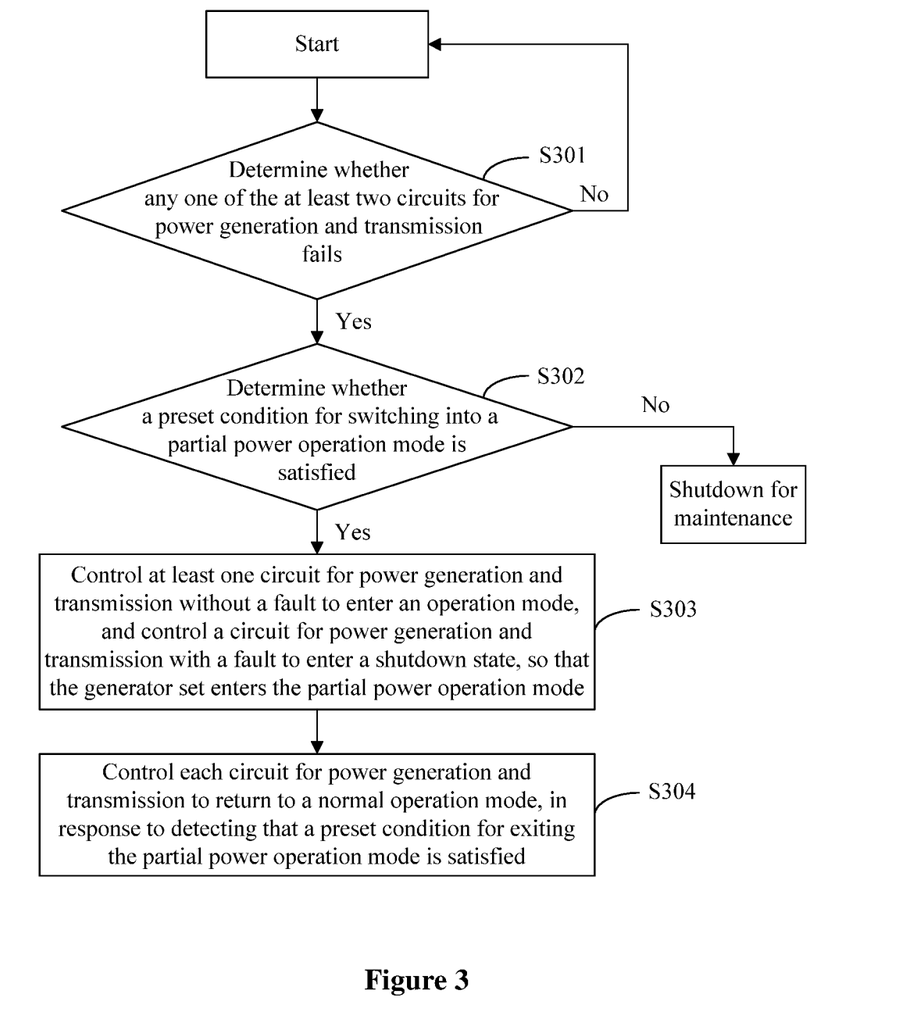
FIG. 3 is a detailed schematic flow chart of a method for controlling an operation of a generator set according to an embodiment of the present disclosure.

Reference is made to FIG. 3, which is a detailed schematic flow chart of a method for controlling an operation of a generator set according to an embodiment of the present disclosure. When the generator set fails and stops to operate, firstly, it is determined that whether a motor or a converter fails. Then it is determined manually that whether it is possible to enter the partial power operation mode based on data about motor insulation. If it is in an automatic switching mode, the converter may switch to the partial power operation mode automatically. The converter may switch to the partial power operation mode manually, once the automatic switching fails. Specifically, the method for controlling the operation of the generator set includes following steps S301 to S304.

In step S301, it is to detect whether any one of the at least two circuits for power generation and transmission fails. If a fault is detected, then proceed to step S302; else, perform the step S301 repeatedly.

In an embodiment, it may determine whether a fault occurs to a winding of a generator and/or a sub group of converters matched with the winding of the generator in each circuit for power generation and transmission of the generator set.

Specifically, a fault source can be determined by a main control system upon receiving fault information. The inventor concluded from actual operation of the generator set that, a probability of a fault occurring to a winding of the generator is very low under a normal situation, thus generally no fault information of the winding of the generator is detected by the main control system, and only after a problem of the winding of the generator continuously causes a fault of a converter or a sub group of converters, will the main control system detect the winding of the generator. When necessary, the main control system may assume that there is no fault in the winding of the generator, and directly detect whether there is a fault in the converter or the sub group of converters.

In an embodiment, after the main control system receives fault information of the converter or the sub group of converters, it is possible to manually or automatically control the failed converter or the failed sub group of converters to shut down. In a manual control mode, the failed converter may be kept in a shutdown state, and a maintenance worker may determine an actual situation of the failed converter remotely or locally, so as to decide whether to control a circuit without a fault to enter an operation mode.

In step S302, it is determined whether a preset condition for switching into a partial power operation mode is satisfied. Proceed to step S303 if it is determined that the preset condition for switching into the partial power operation mode; else, the generator set is shut down for maintenance.

In an embodiment, it may be determined whether at least one circuit for power generation and transmission without a fault meets the preset condition for switching into the partial power operation mode, based on feedback information on a state of the converter in each circuit for power generation and transmission.

Following cases may be included with regard to the main control system determining whether the generator set satisfies the condition for switching into the partial power operation mode. When it is determined for the first time by the main control system responsible for the operation of the entire generator set that, at least one circuit for power generation and transmission without a fault meets the condition for switching into the partial power operation mode, a prompt message regarding that the at least one circuit for power generation and transmission meets the condition for switching into the partial power operation mode may be showed to the maintenance worker of the generator set. If the main control system receives a manual reset command inputted by the maintenance worker in response to the prompt message within a specified time period, then then main control system may determine that the condition for switching into the partial power operation mode is met. If the manual reset command is not received by the main control system within the specified time period, the main control system may control each circuit for power generation and transmission to reset automatically, and if the main control system detects that the automatic reset fails, then the main control system may determine that the condition for switching into the partial power operation mode is met.

In step S303, it is to control at least one circuit for power generation and transmission without a fault to enter an operation mode; and control a circuit for power generation and transmission with a fault to enter a shutdown state, so that the generator set enters into the partial power operation mode.

In an embodiment, it is possible to control the at least one circuit for power generation and transmission without a fault to enter the operation mode based on a valid partial power permission control word of the at least one circuit for power generation and transmission without a fault, and to control the circuit for power generation and transmission with a fault to enter the shutdown state based on an invalid partial power permission control word of the circuit for power generation and transmission with a fault.

It is noted that, it is also possible to control the valid partial power permission control word and the invalid partial power permission control word to be interlocked. For example, in a normal operation mode, the partial power permission control word of each main circuit serving as the circuit for power generation and transmission is set to be 0, where "0" indicates "forbidden", which means invalid. While in the partial power operation mode, partial power permission control words of the main circuits are interlocked, that is, the partial power permission control words cannot be 1 simultaneously, where "1" indicates "allowable", which means valid.

To reduce vibration of a generator, harmonic may be injected into a high-power generator such as a large-sized generator according to a preset control strategy of a converter in the embodiment of the present disclosure, to reduce the vibration and noise of the generator. Specifically, any one of the circuits for power generation and transmission in the operation mode may be injected with matched harmonic. The way of injecting harmonic may be based on experimental data. For a wind turbine, an amount of the harmonic injected may be different, and the way of injecting harmonic may be different, depending on a blade of the wind turbine.

In an embodiment, if the main control system fails to control the at least one circuit for power generation and transmission without a fault of the generator set to enter the operation mode and the times of failing reaches a specified number, the main control system may control the entire converter of the generator set to shut down. For example, the specified number may be 3.

In an embodiment, when the at least one circuit for power generation and transmission without a fault has been controlled to enter the operation mode for a specified operation time, the main control system may control the at least one circuit for power generation and transmission to stop operating for a specified shutdown time, after then the main control system continues to control the at least one circuit for power generation and transmission without a fault to enter the operation mode again. For example, the specified operation time may be 48 hours, and the specified shutdown time may be 2 hours.

It is noted that, when the generator set enters the partial power operation mode, the generator set can control the circuit to operate normally during a low power stage. However, if the generator set has not yet reached a rated speed during a half power stage, for example, when an output power of one set of windings of a double-winding generator has reached its rated output power, then a torque may exceed a rated value of the converter, which may cause overcurrent at the generator side. In order to avoid such unfavorable situations, in an embodiment, when an output power of any one circuit for power generation and transmission without a fault being controlled to enter the operation mode reaches a specified output power, it is possible to adjust a rotating speed of a sub group of converters of the circuit for power generation and transmission without a fault according to a specified control strategy parameter. For example, the specified output power may be half of a rated output power of the generator.

Specifically, in the partial power operation mode, when the output power of the generator is close to a setting power, the main control system may increase the rotating speed of the converter by switching the control strategy parameter, to avoid overcurrent of the generator.

Further, a control variable for the partial power operation mode may be introduced into the control strategy. When the output power of the generator under the partial power operation mode is close to the half power, it is possible to switch a value of the corresponding control variable, such that the converter may reach to the rated rotating speed, to avoid overcurrent at the generator side.

In step S304, in response to determining that a preset condition for exiting the partial power operation mode is satisfied, each circuit for power generation and transmission is controlled to return to a normal operation mode.

Specifically, when the main control system determines that the generator set being in the partial power operation state satisfies the preset condition for exiting the partial power operation mode, the main control system may control each circuit for power generation and transmission to return to the normal operation mode.

For example, if the main control system may determine that the generator set being in the partial power operation state satisfies the preset condition for exiting the partial power operation mode, in response to detecting that the fault has discharged from the circuit for power generation and transmission circuit which had a fault before.

For example, after the generator set has entered the partial power operation mode, the main control system will not instruct the generator set being in the partial power operation mode to shut down and exit the partial power operation mode until faults of the generator set are able to be handled. After the faults are removed, each circuit is controlled to return back to the normal operation mode.

In an automatic control mode, the main control system may automatically control the circuit to enter the partial power operation mode according to fault classification and fault frequency of the converter. It is noted that, manual control is allowed to be involved for switching into the partial power operation mode, even though the circuit is under the automatic control mode.

Figure 4:
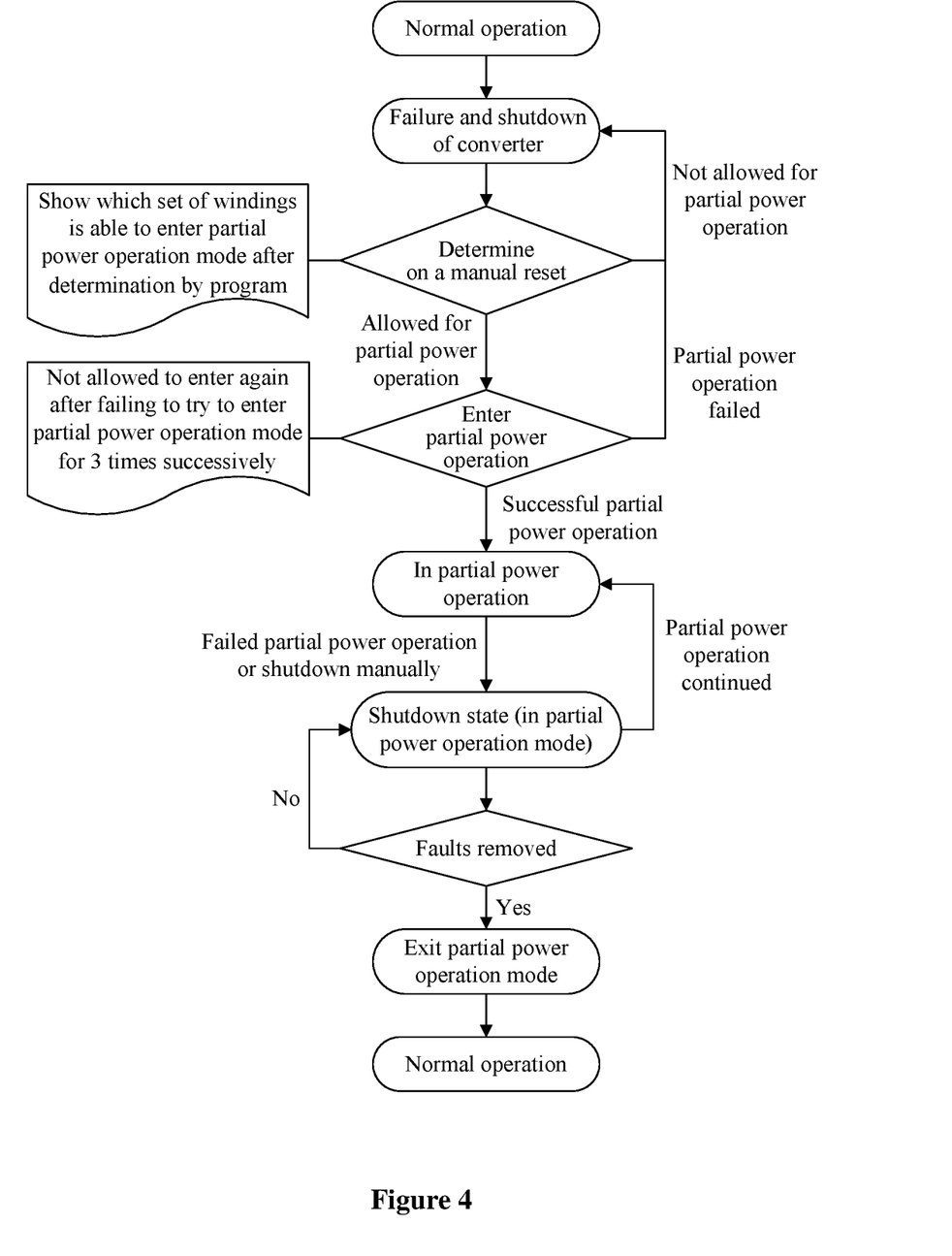
FIG. 4 is a schematic flow chart illustrating a manual switching process in a method for controlling an operation of a generator set according to an embodiment of the present disclosure.

FIG. 4 is a schematic flow chart illustrating a manual switching process in a method for controlling an operation of a generator set according to an embodiment of the present disclosure. As shown in FIG. 4, the main control system may control a converter or a sub group of converters without a fault through a manual switching process, after receiving fault information fed back from a converter. The manual switching process may include the following steps 1) to 5).

In step 1), it may be determined manually by a maintenance worker that, whether a converter or a sub group of converters without a fault is able to enter a partial power operation mode, based on operation information of the generator set displayed on an interface.

In step 2), the main control system may send a control command for entering the partial power operation mode to the converter or the sub group of converters without a fault based on state information fed back from the converter, in response to determining that the converter or the sub group of converters without a fault is allowed to enter the partial operation mode.

In step 3), when the converter or the sub group of converters without a fault has successfully entered the partial operation mode and operates normally, the generator set may operate in the partial power operation mode.

In step 4), when the fault of the generator set is able to be handled, the main control system may control the generator set to shut down and exit the partial power operation mode.

In step 5), the generator set that has been shut down may return to the normal operation mode after the fault is removed.

Figure 5:
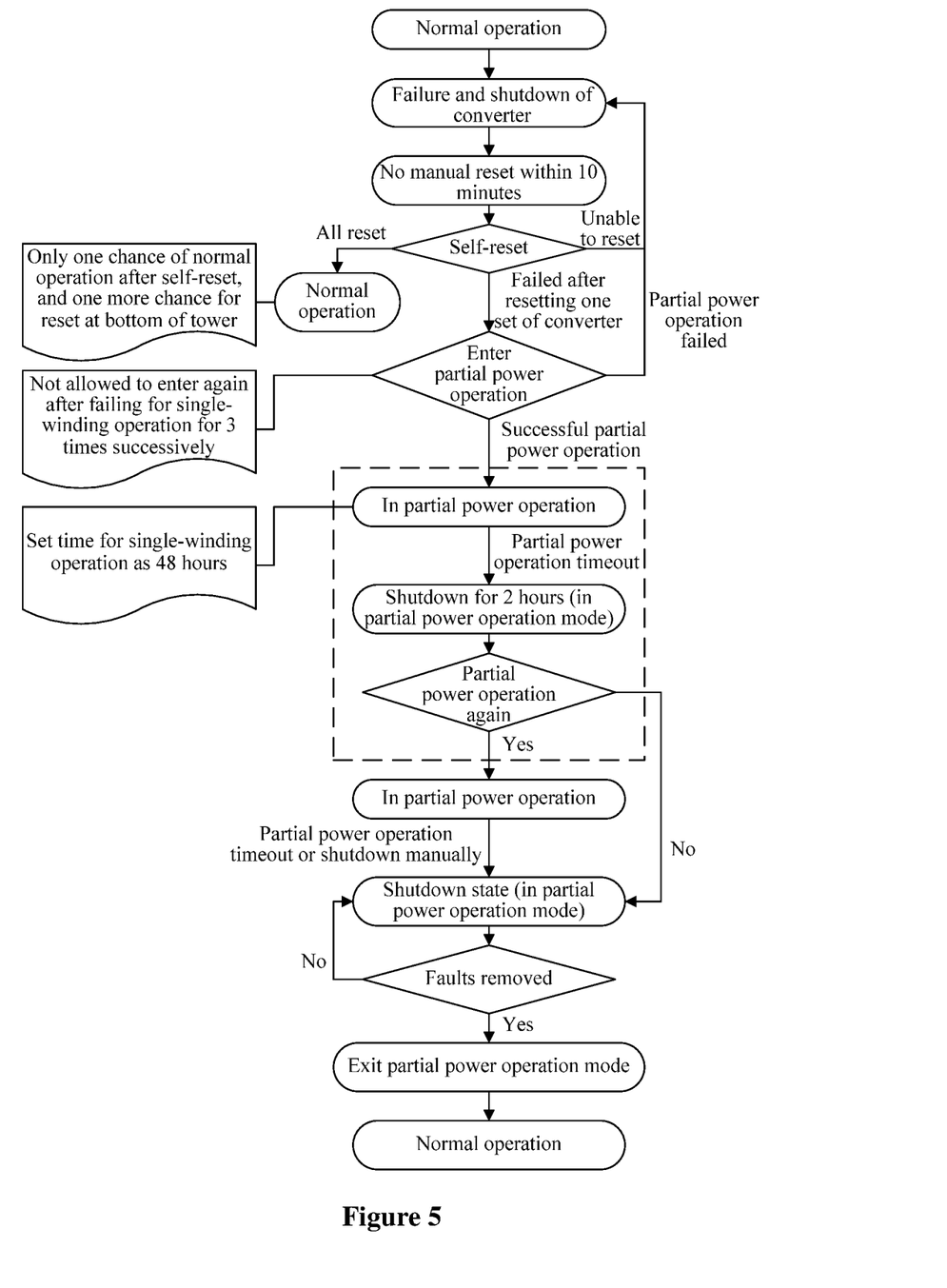
FIG. 5 is a schematic flow chart illustrating an automatic switching process in a method for controlling an operation of a generator set according to an embodiment of the present disclosure.

FIG. 5 is a schematic flow chart illustrating an automatic switching process in a method for controlling an operation of a generator set according to an embodiment of the present disclosure. As shown in FIG. 5, when the main control system detects that a fault occurs to a converter or a sub group of converters in the generator set, the following steps 1) to 5) are performed.

In step 1), firstly wait for a manual reset signal. If the manual reset signal is not received within a preset time period, the main control system may control a converter or a sub group of converters with a fault to reset automatically. For example, the control system may send an automatic reset signal if the manual reset signal is not received within 10 minutes after the converter fails.

In step 2), after the automatic reset, if all faults of the converter have been removed, which means completely reset, the generator set may continue to operate normally. If a same fault signal is sent by the generator set again, the main control system may control a corresponding converter or sub group of converters with a fault to switch to the partial power operation mode, based on a state word (such as Winding1OK signal) fed back from the converter.

In step 3), a converter or a sub group of converters without a fault may be switched to the partial power operation mode.

In step 4), when faults of the generator set are able to be removed, the main control system may control the generator set to shut down and exit the partial power operation mode.

In step 5), the generator set that has been shut down may return to the normal operation mode after the faults are removed.

A generator including two main circuits is taken as an example, to describe a specific process of controlling one main circuit to switch into a partial power operation mode when another main circuit fails according to an embodiment of the present disclosure.

With reference to FIGS. 1 to 3, FIG. 6 shows a process of switching into a partial power operation mode based on a partial power permission control word, in a method for controlling an operation of a generator set including two main circuits according to an embodiment of the present disclosure.

Figure 6:
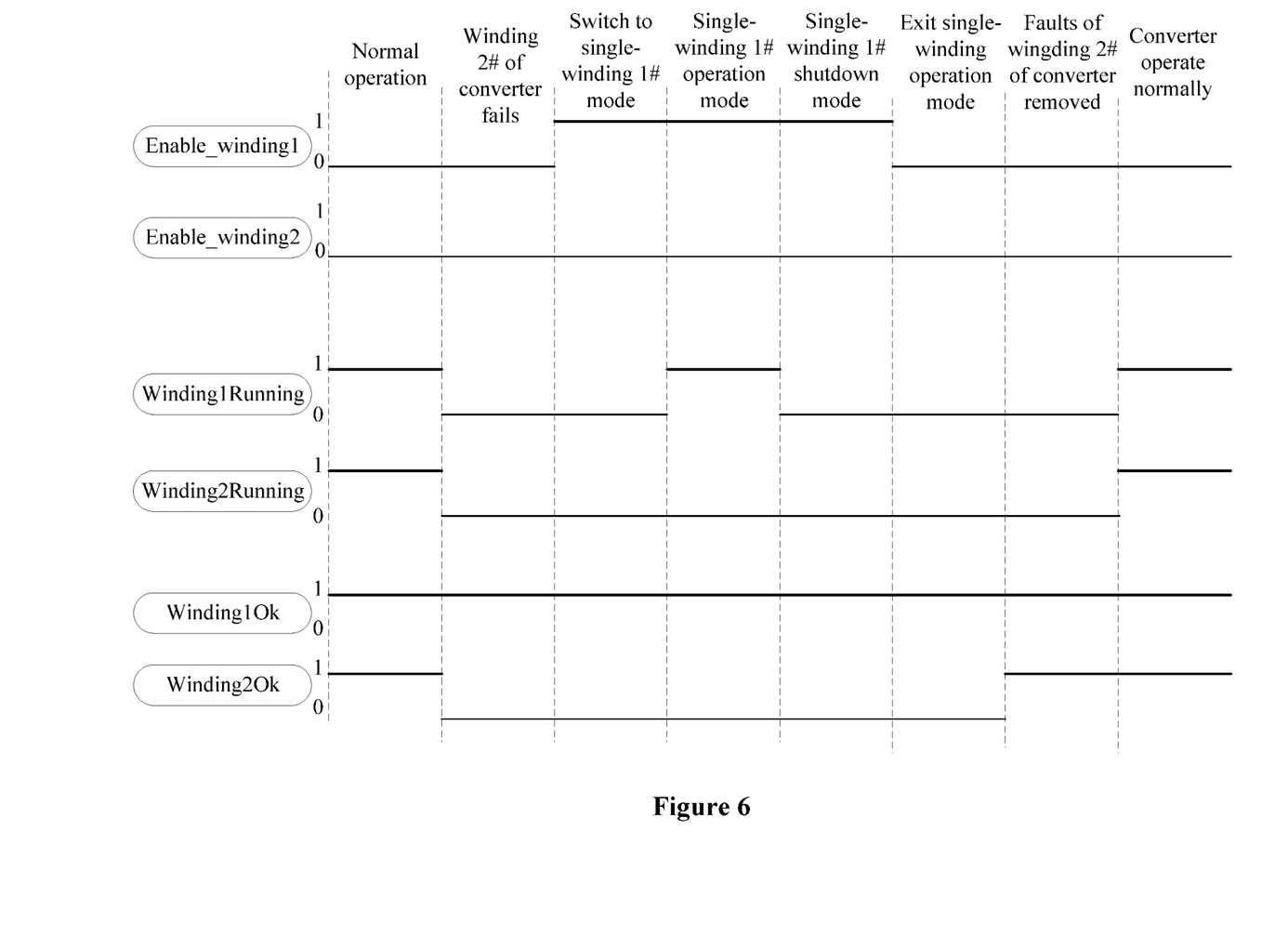
FIG. 6 shows a process of switching into a partial power operation mode based on a partial power permission control word, in a method for controlling an operation of a generator set according to an embodiment of the present disclosure.

The process as shown in FIG. 6 is taking a generator including two main circuits of FIG. 1 as an example, where the main circuit 1 # and the main circuit 2 # each includes a sub group of converters matched with a corresponding winding of the generator, and when the main circuit 2 # has failed during a normal operation of both the main circuit 1 # and the main circuit2 #, a main control system may control the main circuit 1 # without a fault to switch to a partial power operation mode.

FIG. 6 shows a state of a control word and a feedback word of the generator set including two circuits. The main control system may group faults of a converter in advance. If a set of windings fails three times successively or fails to operate, the main control system may control the failed set of windings to exit a normal operation mode. Furthermore, the main control system may determine a current operation state of a specified converter based on the feedback word of the converter shown in FIG. 6, to decide which circuit without a fault is to be controlled to enter the partial power operation mode.

State information fed back to the main control system from the converter shown in FIG. 6 may include the following items 1 to 3.

1. A control word for a partial power operation mode corresponding to a communication protocol between the main control system and the converter, where the converter may perform the partial power operation mode based on partial power permission control words below:

an independent operation permission control word of the main circuit 1 #: "Enable_Winding1"; and an independent operation permission control word of the main circuit 2 #: "Enable_Winding2";

where, "0" represents forbidden, while "1" represents allowable;

where, the partial power permission control words may be "0" simultaneously in a normal operation mode; while entering the partial power operation mode, the partial power permission control words may be in an interlocked state, that is, the partial power permission control words will not be 1 simultaneously.

2. An operation state fed back from the converter to the main control system, where each group of converters may feed back the following operation state word to the main control system, to indicate an operation state of a corresponding circuit:

an operation state word of the main circuit 1 #: "Winding1Running"; and an operation state word of the main circuit 2 #: "Winding2Running";

where "0" represents being out of operation, while "1" represents being in operation.

3. A state word fed back from the converter to the main control system, where each group of converters may feed back the following state word to the main control system, to indicate whether a corresponding circuit is able to enter the partial power operation mode:

a state word of the main circuit 1 #: "Winding1OK"; and a state word of the main circuit 2 #: "Winding2OK";

where "0" represents unable, while "1" represents able.

An operation process of the main circuit of the generator set including the main circuit 1 # and the main circuit 2 # as shown in FIG. 6 is described as follows.

Initially, each group of converters feeds back a corresponding state word to the main control system, to indicate whether a corresponding circuit is able to enter the partial power operation mode. As shown in FIG. 6, when the generator set is running normally in the initial stage, the state word "Winding1OK" fed back from the main circuit 1 # to the main control system is "1", hence the main control system may determine that the main circuit 1 # is able to enter the partial power operation mode. Similarly, the main control system may also determine that the main circuit 2 # is able to enter the partial power operation mode. Moreover, the main control system may receive the operation state word "Winding1Runing" of the main circuit 1 # and the operation state word "Winding2Running" of the main circuit 2 #, which are both "1". In addition, the main control system may receive the independent operation permission control word "Enable_Winding1" of the main circuit 1 # and the independent operation permission control word "Enable_Winding2" of the main circuit 2 #, which are both "0", it indicates at this time both the main circuit 1 # and the main circuit 2 # are forbidden to enter the partial power operation mode.

If the main circuit 2 # fails, the main circuit 2 # may feed back the state words "Winding2OK" and "Winding2Running" to the main control system, where the state word Winding2OK is "0", indicating that the main circuit 2 # is not able to enter the partial power operation mode, and the state word Winding2Running is "0", indicating that the main circuit 2 # is out of operation.

The main control system then may determine whether the main circuit 1 # is in a normal operation state. As shown in FIG. 6, the state word "Winding1OK" of the main circuit 1 # is "1" and the state word "Winding1Running" of the main circuit 1 # is "0" at this time, which indicates that the main circuit 1 # is out of operation currently and is able to enter the partial power operation mode.

If the main control system has determined that the main circuit 1 # satisfies a condition for switching the partial power operation mode, the main control system may control the generator set to switch into the partial power operation mode, that is, an operation mode in which a single winding 1 # operates. The three operation words fed back by the main circuit 2 # to the main control system are all "0" at this time.

When it is able to remove faults of the main circuit 2 #, the main control system may control the generator set to shut down and exit the partial power operation mode.

After the faults are removed, the shutdown generator set may return to the normal operation mode. As shown in FIG. 6, the state word "Winding1OK" of the main circuit 1 # is "1", the state word "Winding2OK" of the main circuit 2 # is "1", the state word "Winding1Running" of the main circuit 1 # is "1", and the state word "Winding2Running" of the main circuit 2 # is "1" at this time.

The way of feeding back the state information in the above process is also applicable to a generator set including more than two main circuits.

Figure 7:
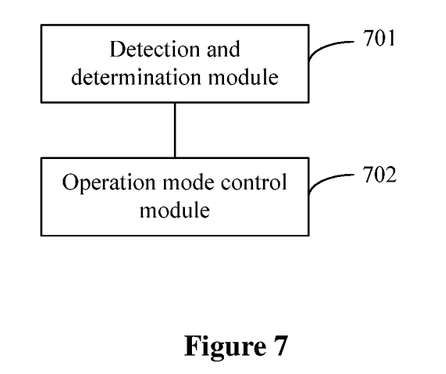
FIG. 7 is a structural block diagram of an apparatus for controlling an operation of a generator set according to an embodiment of the present disclosure.

Correspondingly, an apparatus for controlling an operation of a generator set is also provided in an embodiment of the present disclosure. The generator set includes at least two circuits for power generation and transmission. As shown in FIG. 7, the apparatus may include a detection and determination module 701 and an operation mode control module 702. The detection and determination module 701 may determine whether a preset condition for switching into a partial power operation mode is satisfied, in response to detecting that any one of the at least two circuits for power generation and transmission fails. In a case that it is determined by the detection and determination module 701 that the preset condition for switching into the partial power operation mode is satisfied, the operation mode control module 702 may control at least one circuit for power generation and transmission without a fault among the at least two circuits for power generation and transmission to enter in an operation mode, and control a circuit for power generation and transmission with a fault to enter in a shutdown state, so that the generator set enters the partial power operation mode.

A system for controlling an operation of a generator set is further provided in an embodiment of the present disclosure, where the generator set includes at least two circuits for power generation and transmission. The system may include a memory and a processor connected to the memory. The processor is also connected to the at least two circuits for power generation and transmission of the generator set. The system further includes at least one program stored in the memory. The method for controlling an operation of a generator set according to any one of the embodiments in the present disclosure is to be performed when the program is executed by the processor.

A storage medium is provided in an embodiment of the present disclosure. The storage medium is stored with a computer program corresponding to the method for controlling an operation of a generator set according to an embodiment of the present disclosure.

Those skilled in the art can understand that, unless otherwise defined, all terms (including technical terms and scientific terms) used herein have the same meaning as those generally understood by those of ordinary skill in the art to which the present disclosure belongs. It should also be understood that, unless specifically defined, such as those defined in a general dictionary, all terms should be understood to have a meaning consistent with the meaning in the context of the related technology, and should not be explained in an idealized or an overly formal way.

The description above is merely a part of the embodiments of the present disclosure. It should be noted that, several alternations and modifications can be made by those skilled in the art without deviation from the principle of the present disclosure, and such alternations and modifications should be considered as falling within the scope of the present disclosure.

The invention claimed is:

1. A method for controlling an operation of a generator set, wherein the generator set comprises at least two circuits for power generation and transmission, the method comprising:
   determining whether a preset condition for switching into a partial power operation mode is satisfied, in response to detecting that any one circuit for power generation and transmission of the at least two circuits for power generation and transmission fails; and
   controlling at least one circuit for power generation and transmission without a fault among the at least two circuits for power generation and transmission to enter an operation mode, and controlling a circuit for power generation and transmission with a fault to enter a shutdown state, in response to determining that the preset condition for switching into the partial power operation mode is satisfied, so that the generator set enters the partial power operation mode.

2. The method for controlling the operation of the generator set according to claim 1, wherein determining whether the preset condition for switching into the partial power operation mode is satisfied comprises:
   determining whether the at least one circuit for power generation and transmission without a fault satisfies a condition for operating in the partial power operation mode, based on state information fed back from a converter in each circuit for power generation and transmission;
   showing a prompt message indicating that the at least one circuit for power generation and transmission without a fault satisfies the condition for operating in the partial power operation mode, in response to determining that the at least one circuit for power generation and transmission without a fault satisfies the condition for operating in the partial power operation mode; and
   determining that the condition for switching into the partial power operation mode is satisfied, in a case that a manual reset command in response to the prompt message is received within a specified time period.

3. The method for controlling the operation of the generator set according to claim 2, further comprising:
   controlling each circuit for power generation and transmission to reset automatically in a case that the manual reset command in response to the prompt message is not received within the specified time period, and determining that the condition for switching into the partial power operation mode is satisfied if the automatic reset fails.

4. The method for controlling the operation of the generator set according to claim 1, wherein controlling the at least one circuit for power generation and transmission without a fault among the at least two circuits for power generation and transmission to enter in the operation mode, and controlling the circuit for power generation and transmission with a fault to enter in the shutdown state comprises:
   controlling the at least one circuit for power generation and transmission without a fault to enter in the operation mode, based on a valid partial power permission control word of the at least one circuit for power generation and transmission without a fault; and
   controlling the circuit for power generation and transmission with a fault to enter in the shutdown state, based on an invalid partial power permission control word of the circuit for power generation and transmission with a fault.

5. The method for controlling the operation of the generator set according to claim 4, further comprising:
   controlling the valid partial power permission control word and the invalid partial power permission control word to be interlocked with each other.

6. The method for controlling the operation of the generator set according to claim 1, wherein, in response to determining that the preset condition for switching into the partial power operation mode is satisfied,
   adjusting a rotating speed of a sub group of converters in the any one circuit for power generation and transmission without a fault and being controlled to enter into the operation mode, based on a specified control strategy parameter, in a case that the any one circuit for power generation and transmission without a fault and being controlled to enter into the operation mode has reached a specified output power.

7. The method for controlling the operation of the generator set according to claim 1, wherein, in response to determining that the preset condition for switching into the partial power operation mode is satisfied,
   controlling an entire converter of the generator set to shut down, in a case that it is failed to control the at least one circuit for power generation and transmission without a fault to enter the operation mode and the number of failures reaches a specified number.

8. The method for controlling the operation of the generator set according to claim 1, wherein, in response to determining that the preset condition for switching into the partial power operation mode is satisfied,
   controlling the at least one circuit for power generation and transmission without a fault to stop operating for a specified shutdown time, in a case that the at least one circuit for power generation and transmission without a fault has been controlled to enter the operation mode for a specified operation time, and after then, continuing to control the at least one circuit for power generation and transmission without a fault to enter the operation mode.

9. An apparatus for controlling an operation of a generator set, wherein the generator set comprises at least two circuits for power generation and transmission, the apparatus comprising:
   a detection and determination module, configured to: determine whether a preset condition for switching into a partial power operation mode is satisfied, in response to detecting that any one of the at least two circuits for power generation and transmission fails; and
   an operation mode control module, configured to: control at least one circuit for power generation and transmission without a fault among the at least two circuits for power generation and transmission to enter an operation mode, and control a circuit for power generation and transmission with a fault to enter a shutdown state, in response to determining that the preset condition for switching the partial power operation mode is satisfied, so that the generator set enters the partial power operation mode.

10. A system for controlling an operation of a generator set, wherein the generator set comprises at least two circuits for power generation and transmission, the system comprising:
 a memory;
 a processor connected to the memory and connected to the at least two circuits for power generation and transmission; and
 at least one program stored in the memory, wherein the at least program is executed by the processor, to perform the method for controlling the operation of the generator set according to claim 1.

11. A storage medium, wherein the storage medium is stored with a computer program corresponding to the method for controlling the operation of the generator set according to claim 1.

12. The method for controlling the operation of the generator set according to claim 2, wherein controlling the at least one circuit for power generation and transmission without a fault among the at least two circuits for power generation and transmission to enter in the operation mode, and controlling the circuit for power generation and transmission with a fault to enter in the shutdown state comprises:
 controlling the at least one circuit for power generation and transmission without a fault to enter in the operation mode, based on a valid partial power permission control word of the at least one circuit for power generation and transmission without a fault; and
 controlling the circuit for power generation and transmission with a fault to enter in the shutdown state, based on and invalid partial power permission control word of the circuit for power generation and transmission with a fault.

13. The method for controlling the operation of the generator set according to claim 3, wherein controlling the at least one circuit for power generation and transmission without a fault among the at least two circuits for power generation and transmission to enter in the operation mode, and controlling the circuit for power generation and transmission with a fault to enter in the shutdown state comprises:
 controlling the at least one circuit for power generation and transmission without a fault to enter in the operation mode, based on a valid partial power permission control word of the at least one circuit for power generation and transmission without a fault; and
 controlling the circuit for power generation and transmission with a fault to enter in the shutdown state, based on an invalid partial power permission control word of the circuit for power generation and transmission with a fault.

* * * * *